Patented Feb. 12, 1935

UNITED STATES PATENT OFFICE 1,991,012

CELLULOSE COMPOSITION

Thomas S. Carswell and William Gump, St. Louis, Mo., assignors, by mesne assignments, to Monsanto Chemical Company, a corporation of Delaware No Drawing. Application January 16, 1929, Serial No. 333,015

3 Claims. (Cl. 106—40)

This invention relates to cellulose compositions of the kind that comprise a substance of low volatility, commonly referred to as a "plasticizer", which is incorporated in the composition for the purpose of rendering it plastic or flexible, by forming a colloidal solution with the cellulosic compound.

We have discovered that substances in the class comprising aryl sulfonyl derivatives of acetylated aromatic and aliphatic amines, are well adapted for use as plasticizers in cellulose compositions, and that when used in conjunction with cellulose ester or cellulose ether and a suitable solvent, will convert the cellulose ester or cellulose ether into a composition or compound that is capable of being worked into molded objects, sheets or films, lacquers and filaments. Such a composition or compound is plastic; it shows great flexibility; it will not become brittle, and it will not deteriorate upon aging or when subjected to as high a temperature as 140° C. Moreover, it is more stable to light and will not turn yellow or change color as easily as prior cellulose compositions or compounds of the kind that comprise a plasticizer consisting of unacetylated aryl sulfonyl derivatives of aliphatic or aromatic amines.

Various substances in the class comprising aryl sulfonyl derivatives of acetylated amines may be used as the plasticizer of our new composition of matter, but we prefer to use para toluene sulfonacetanilid represented structurally,

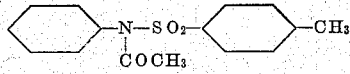

or para toluene sulfonyl N-ethyl acetamid represented structurally,

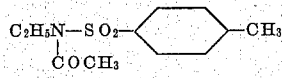

The other ingredients of the composition consist of a suitable solvent and a soluble cellulose derivative of the cellulose ether or cellulose ester classes.

The plasticizer of our new cellulosic composition can consist entirely of a substance, or a mixture of substances, of the kind above specified, or the plasticizer can consist of an aryl sulfonyl derivative of an acetylated aliphatic or aromatic amine. The compositions falling within the scope of the present invention may be designated broadly by the following formula:

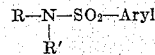

where R is an aromatic or aliphatic nucleus, R' is an acetyl radical and "Aryl" represents an aromatic nucleus. Such materials may be combined in the proper proportions with a substance or substances of the kind heretofore used as plasticizers in cellulose ester and cellulose ester compositions, such, for example, as camphor, dialkyl phthalates, N-alkylated acetyl and aryl-sulfon amines, tetrasubstituted ureas and phosphates of the class containing triphenyl phosphate, tricresylphosphate or similar substances.

The following are three examples of procedure that may be used to produce our new composition of matter:

*Example 1.*—Dissolve from 20 to 40 parts of para toluene sulfon acetanilid and 1 part of urea (as stabilizer) in 400 parts of a solvent mixture containing

| | Parts |
|---|---|
| Ethyl alcohol | 10 |
| Benzene | 10 |
| Ethylacetate | 9 |
| Amylacetate | 2 |
| Normal butanol | 1 |

Instead of using a solvent mixture of the kind above described, we may use the same amount of another solvent that is common to nitrocellulose and to the para toluene sulfon acetanilid that is used as the plasticizer of the composition. Thereafter, add 100 parts of nitrocellulose and allow the mass to soak or macerate at room temperature in a closed vessel until gelatinization has taken place.

*Example 2.*—Dissolve 10 to 20 parts of para toluene sulfon ortho chlor acetanilid and 10 to 20 parts of diethyl diphenyl urea in 400 parts of the solvent mixture described in Example 1, or in the same quantity of another solvent common to both the plasticizers and the nitrocellulose. Thereafter, add 100 parts of nitrocellulose and proceed, as described in Example No. 1, namely, allow the mass to soak or macerate at room temperature in a closed vessel until gelatinization has taken place.

*Example 3.*—Dissolve from 20 to 40 parts of N-ethyl paratoluene sulfon acetamid, and 1 part of urea in 600 parts of acetone or in the same quantity of another solvent common to the plasticizer and to cellulose acetate. Thereafter, add 100 parts of celulose acetate of the variety or kind that is soluble in acetone and allow the mass to soak or macerate at room temperature in a closed vessel until gelatinization has taken place.

Any of the above procedures will produce a compound or composition that can be worked in the usual manner into sheets, films, lacquers, filaments and molded objects. Such a compound or composition, in addition to being plastic and flexible, is not liable to become brittle or deteriorate upon aging or when exposed to sunlight or subjected to a temperature as high as 140°. While we have obtained good results with approximately the proportions of substances or ingredients above specified, we wish it to be understood that these proportions can be varied without departing from the spirit of our invention.

It will, of course, be understood that coloring matters and other inert substances may be incorporated in the composition during the operation of producing the same.

Having thus described our invention, what we claim as new and desire to secure by Letters Patent is:

1. A cellulose ester composition containing a plasticizing substance consisting of para toluene sulfonyl acetanilid.

2. A cellulose ester composition containing a plasticizing substance consisting of at least one of the following: para toluene sulfonyl N-ethyl acetamid and para toluene sulfonyl acetanilid.

3. A cellulose ester composition containing an aryl sulphonyl derivative of an acetylated anilid.

THOMAS S. CARSWELL.
WILLIAM GUMP.